No. 823,699. PATENTED JUNE 19, 1906
M. T. ROEMER.
ATTACHMENT FOR PANS AND THE LIKE TO PREVENT BURNING.
APPLICATION FILED JAN. 12, 1906.

Inventor
M. T. Roemer,

UNITED STATES PATENT OFFICE.

MARY T. ROEMER, OF WABASHA, MINNESOTA.

ATTACHMENT FOR PANS AND THE LIKE TO PREVENT BURNING.

No. 823,699.                    Specification of Letters Patent.                    Patented June 19, 1906.

Application filed January 12, 1906. Serial No. 295,762.

*To all whom it may concern:*

Be it known that I, MARY T. ROEMER, a citizen of the United States, residing at Wabasha, in the county of Wabasha and State of Minnesota, have invented certain new and useful Improvements in Attachments for Pans and the Like to Prevent Burning, of which the following is a specification.

This invention relates to an attachment for pans or like articles employed for baking purposes, and has for its primary object to prevent the burning of the pan by providing means for holding the bottom of the pan spaced from the bottom of the oven.

The attachment consists, essentially, of a pair of bail-like members, one of which is preferably placed at each end of the pan and which are adapted to serve as a support for the pan when swung around against the bottom thereof or as handles for lifting the pan or hanging it from a hook or similar support.

For a full description of the invention and the merits thereof and also to acquire a knowledge of the details of construction of the means for effecting the result reference is to be had to the following description and accompanying drawings, in which—

Figure 1:
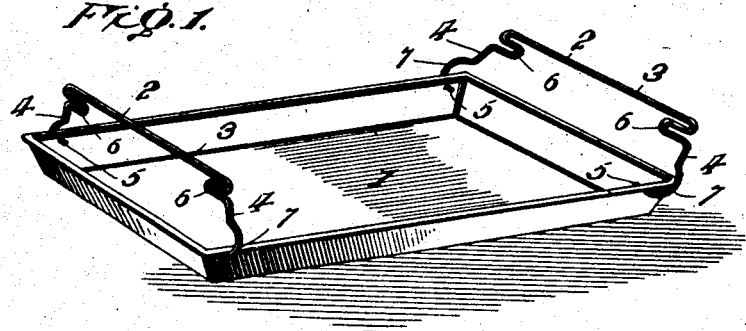
Figure 2:
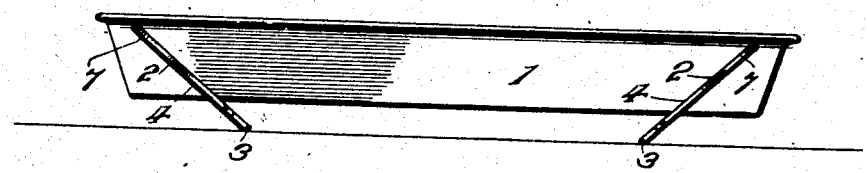
Figure 3:
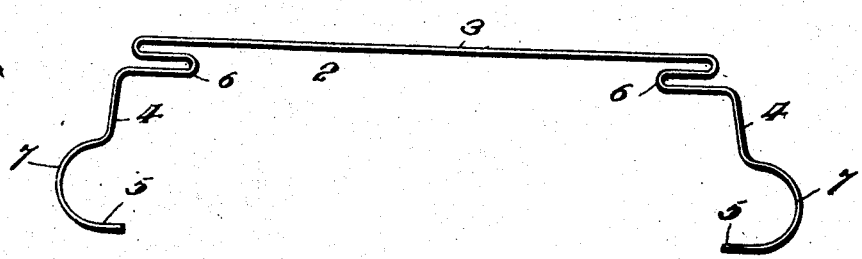

Figure 1 is a perspective view of a pan having the attachment applied thereto and showing it as swung upward to form handles. Fig. 2 is a side elevation of the same with the attachment swung around to form a support for the pan. Fig. 3 is a plan view of one of the bail-like members which constitute the attachment.

Corresponding and like parts are referred to in the following description and indicated in all the views of the drawings by the same reference characters.

The numeral 1 designates a pan of any suitable construction, and which is preferably rectangular in shape, as shown in the drawings.

One of the bail-like members 2, which constitute the essential feature of this invention, is secured to each end of the pan. The cross-piece 3 of the member 2 is of a length corresponding to the width of the pan and is provided at its ends with arms 4, which embrace the sides of the pan and have their extremities bent inwardly and passed through openings therein, as seen at 5. Each of the arms 4 is provided with an inwardly-projecting shoulder adjacent to the cross-bar 3. These shoulders are preferably formed by U-shaped bends in the wire, as seen at 6, and are adapted to engage with the bottom of the pan when the bail-like member 2 is swung around so as to form a support for the pan. Finger-pieces 7 are formed in the arms 4 near the inwardly-bent extremities 5 thereof. These finger-pieces 7 are preferably formed by outwardly-projecting bends in the arms, as seen in the drawings, since this construction enables the attachment to be formed of a single piece of wire.

The distance between the inwardly-bent extremities 5 of the arms 4 and the cross-bar 3 is somewhat greater than the distance between the openings through which the portions 5 are passed and the bottom of the pan. It will thus be understood that when the bail-like members 2 at each end of the pan are swung around until the shoulders 6 engage with the bottom of the pan the arms 4 of the members 2 will slope inwardly toward each other, and there will be no tendency for the pan to rock upon the inwardly-bent portions 5 of the arms 4 as pivots. When in this position, the cross-bars 3 will be prevented from coming into contact with the bottom of the pan because of the shoulders 6 and will form supports which will hold the pan in a slightly-elevated position. The outwardly-projecting U-shaped bends 7 in the arms 4 form convenient finger-pieces for handling the pan while it is in the oven or may be readily engaged by hooks or other suitable implements for sliding the pan to any desired position within the oven. When the bail-like members 2 are swung around above the pan, they may be employed as handles for lifting the same or when swung partly around may be used for hanging the pan from any suitable support. This attachment also prevents the contents of the pan from baking too quickly at the bottom, since the pan is completely surrounded by a film of air and the heat is conducted thereto with equal rapidity on all sides.

Having thus described the invention, what is claimed as new is—

1. The combination of a pan, and a bail-like attachment therefor, said attachment comprising a cross-bar, and arms which have their free ends pivotally connected to the sides of the pan, said arms being provided with inwardly-projecting shoulders which are located near the cross-bar and which are adapted to engage with the bottom of the pan to hold the cross-bar spaced therefrom.

2. The combination of a pan, and a bail-like attachment therefor, said attachment comprising a cross-bar and arms having their free ends pivotally connected to the sides of the pan, said arms being provided with outwardly-projecting bends which form finger-pieces and also with inwardly-projecting shoulders which are adapted to engage with the bottom of the pan to hold the cross-bar spaced therefrom.

3. The combination of a pan, and a bail-like attachment therefor, said attachment comprising a cross-bar and arms which have their free ends pivotally connected to the sides of the pan, said arms being provided with finger-pieces formed by outwardly-projecting U-shaped bends in the arms, and also with shoulders formed by inwardly-projecting U-shaped bends, said shoulders being adapted to engage with the bottom of the pan to hold the cross-bar spaced therefrom.

4. The combination of a pan, and a bail-like attachment therefor, said attachment being formed of a single piece of wire and comprising a cross-bar and arms, the latter having their free ends bent inwardly and passed through openings in the sides of the pan, said arms being formed with outwardly-projecting U-shaped bends which form finger-pieces and are located adjacent to the before-mentioned inwardly-bent ends, and also with inwardly-projecting U-shaped bends which are located near the cross-bar and form shoulders which are adapted to engage with the bottom of the pan and hold the cross-bar spaced therefrom.

In testimony whereof I affix my signature in presence of two witnesses.

MARY T. ROEMER.

Witnesses:
MICHAEL MARX,
GEORGE H. ROEMER.